United States Patent Office 2,750,609
Patented June 19, 1956

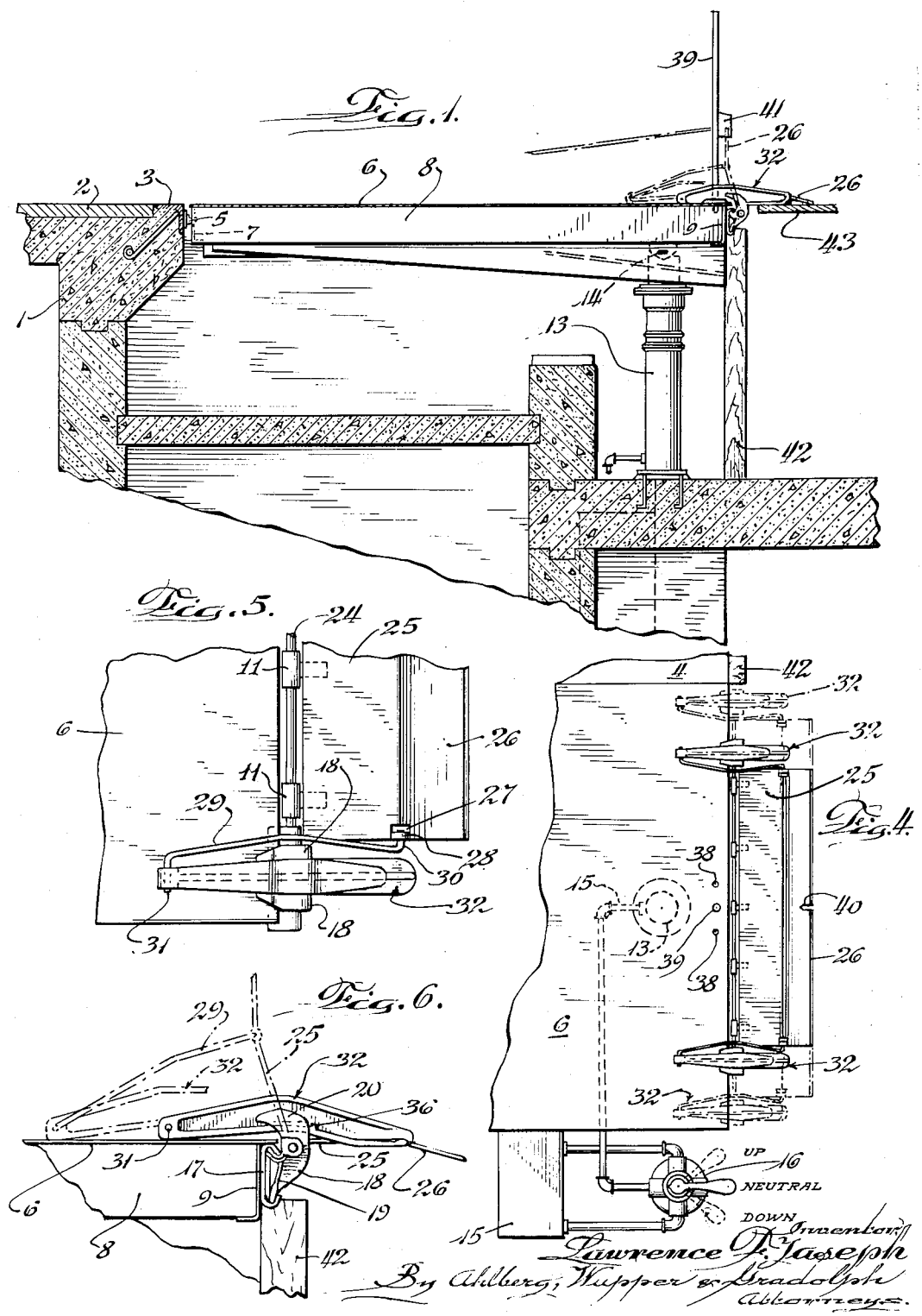

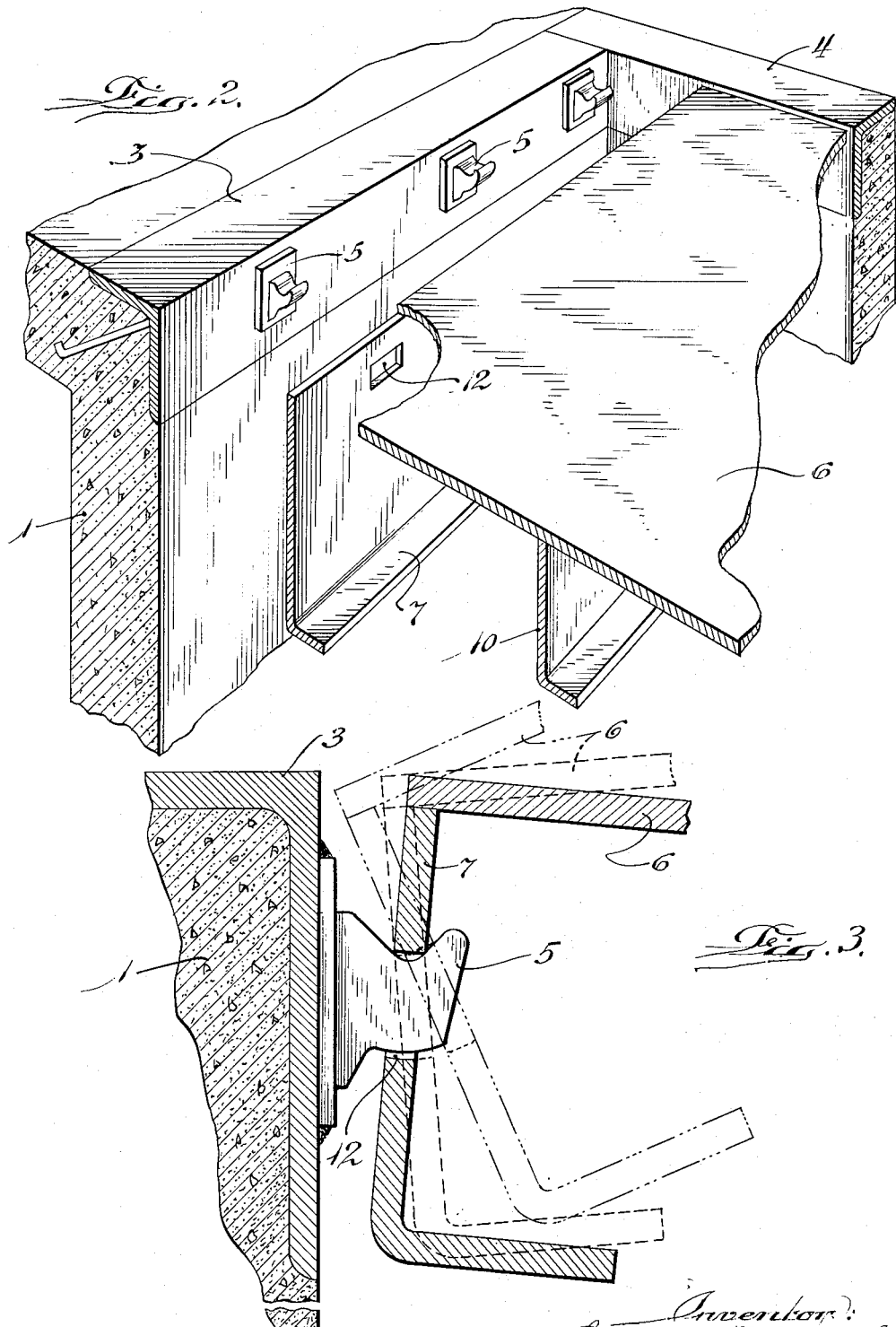

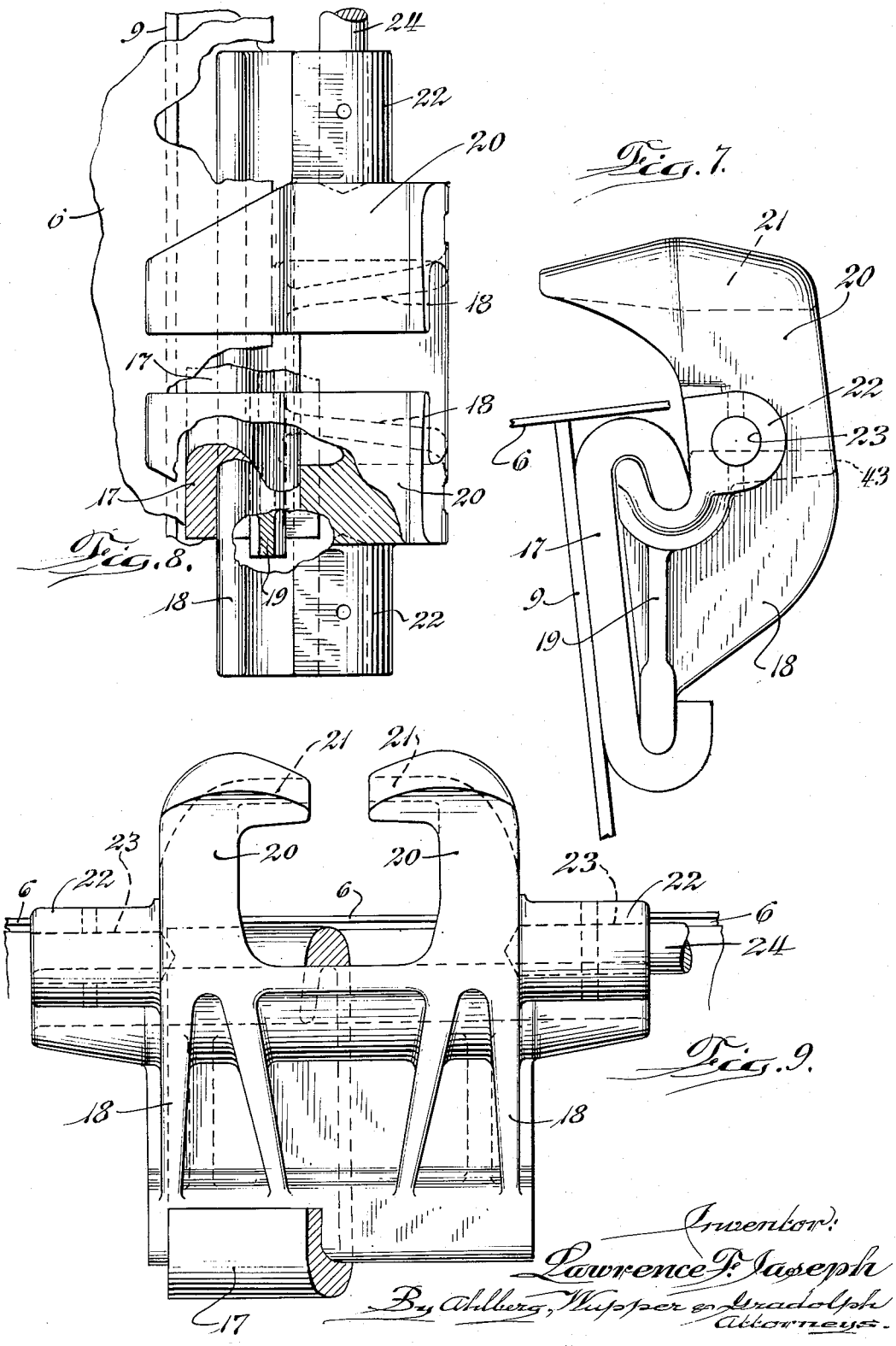

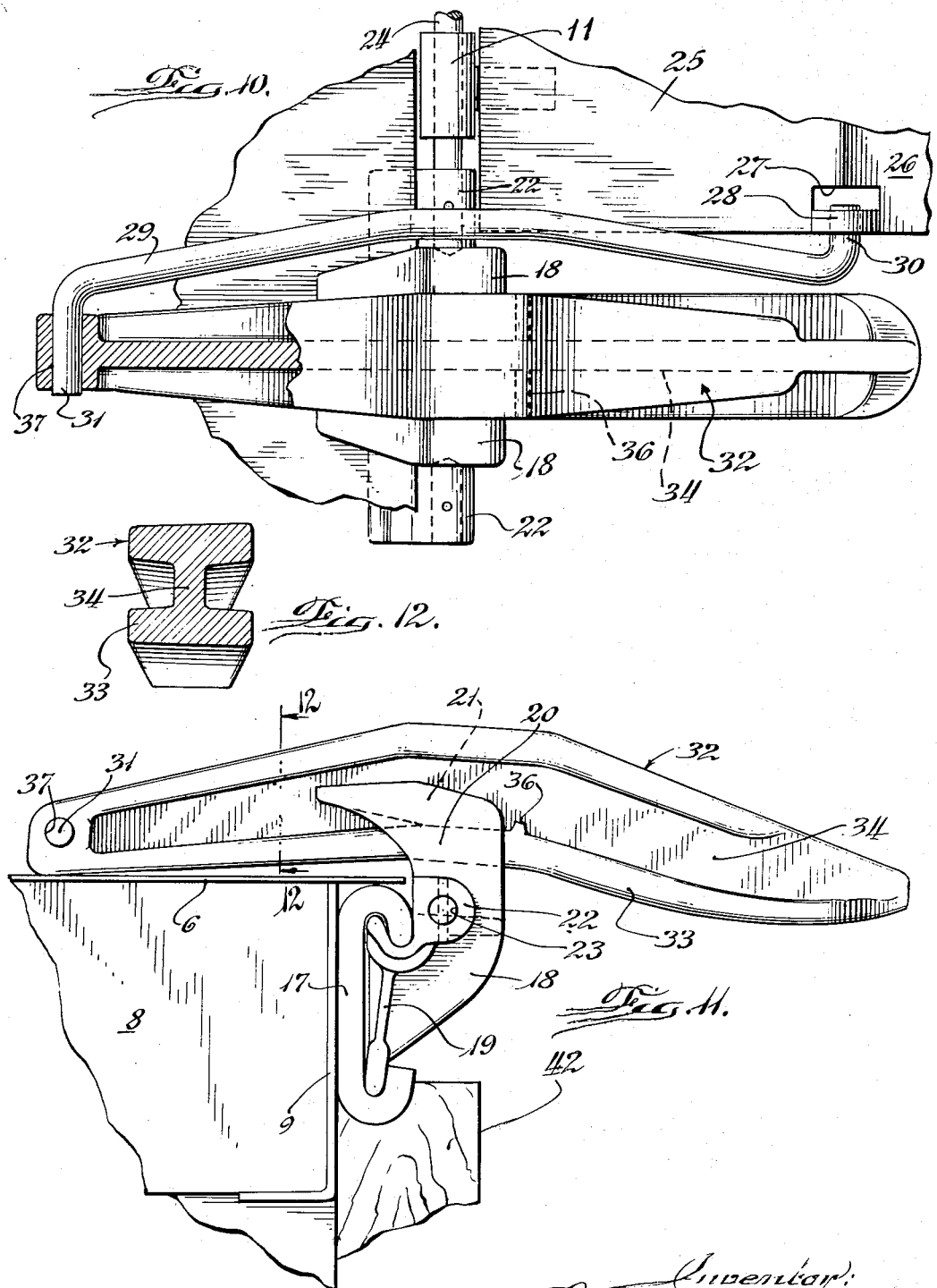

2,750,609
ADJUSTABLE LOADING DOCK

Lawrence F. Jaseph, Memphis, Tenn., assignor to Dover Corporation, a corporation of Delaware Application December 1, 1951, Serial No. 259,394

8 Claims. (Cl. 14—71)

This invention relates to loading docks, and more particularly to an adjustable loading dock including a platform one end of which may be readily raised or lowered to the floor level of a truck to be loaded or unloaded, the platform having a bridge member pivotally secured to its forward end to span the gap between the forward end of the platform and the floor of the truck.

Various means have been employed to span the gap between a truck or other vehicle and a loading dock, so as to facilitate the transfer of goods between the dock and the truck. The simplest of these means consists of a heavy metal bridge plate which is manually placed in position. More recently, there have been developed adjustable loading docks wherein a loading platform is pivotally secured to the dock proper and the forward end of the platform is adapted to be raised or lowered to the floor level of the truck. The loading platform is generally provided with forwardly extending supporting arms fixedly secured to the platform and adapted to bear upon the floor of the truck. In use, it has been necessary that the truck or trailer, for example, be backed into the exact position in order to permit the supporting arms to be positioned on the floor or tailgate of the truck. The forwardly projecting supporting arms are a hazard to the truck body, and many instances of considerable damage to the truck body, or goods carried thereby, have occurred when trucks have not been backed into the centered position.

The principal purpose of the present invention is to provide an adjustable loading dock having retractable supporting arms.

Another primary object of the invention is to provide an adjustable loading dock having a pivotally mounted bridge plate adapted to span the gap between the loading platform and the truck or other carrier.

A further object of this invention is to provide an adjustable loading dock wherein the supporting arms are automatically retracted upon raising of the bridge plate.

Another object of the invention is to provide an adjustable loading dock having a bridge plate which may be moved laterally with respect to the truck or carrier, so as to permit centering of the bridge plate with respect to the carrier.

Other objects and advantages will become apparent from the following description, reference being had to the accompanying drawings, in which:

Fig. 1 is a side elevational view of the adjustable loading dock of this invention, illustrating the dock installed in a conventional loading dock;

Fig. 2 is a perspective view, partly in section, of the means for pivotally securing the loading platform to the dock proper;

Fig. 3 is a side elevational view, partly in section, of the loading platform secured pivotally to the dock proper;

Fig. 4 is a top plan view of the forward end of the adjustable loading dock;

Fig. 5 is a top plan view of a retractable supporting arm and the linkage between the supporting arm and the bridge plate;

Fig. 6 is a side elevational view of a retractable supporting arm and its supporting bracket;

Fig. 7 is a side elevational view, at an enlarged scale, of a supporting bracket positioned within an associated rail means;

Fig. 8 is a top plan view, partly in section, of the supporting bracket of Fig. 7;

Fig. 9 is a front elevational view of the supporting bracket of Fig. 7;

Fig. 10 is a top plan view, at an enlarged scale and partly in section, of the retractable supporting arm;

Fig. 11 is a side elevational view, at an enlarged scale, of a retractable supporting arm and the supporting bracket; and Fig. 12 is a sectional view of the supporting arm, taken on the line 12—12 of Fig. 11.

The adjustable loading dock of this invention is adapted to be mounted in a suitable recess or pit in a dock along the forward edge of the dock proper. The dock walls 1 may be formed of concrete and the floor 2 may be of metal, wood, or concrete. The floor opening is preferably defined by angle members 3 and 4 which are anchored to the walls and floor in accordance with conventional practice. A plurality of spaced hook-like pivotal supports 5 are secured, as by welding, to the angle member 3 which defines the readward edge of the floor opening.

The adjustable loading dock includes a platform 6 preferably formed of a steel plate. Channel or angle members 7, 8, and 9 are secured as by welding, to the lower side of the plate or platform along the rearward edge, the side edges and adjacent the forward edge, respectively. Additional longitudinally and transversely extending channels, angles, T-members, or I-beams 10, are secured to the lower side of the platform or plate so as to impart the necessary strength and rigidity.

The depending web of the rearwardly positioned channel or angle member 7 is provided with a plurality of spaced slots 12 adapted to accommodate the pivotal supports 5, and thereby pivotally support the rearward end of the platform. The vertical dimension of the apertures is greater than the depth of the throat of the pivotal supports so as to allow the platform to be pivoted through a limited angle. The vertical dimension, however, is less than the depth of the forward lip of the pivotal supports so as to prevent the removal of the platform by a horizontal movement.

In Fig. 3, the platform 6 is shown in its lowermost operating position with the web of the angle member 7 inclined forwardly. Intermediate and uppermost operating positions of the platform and web are illustrated by the broken line representations. Throughout this range of angular positions which the dock may assume, the supports 5 will prevent disengagement of the platform. In order to remove the platform from the supports, or attach the platform to the supports, it is necessary to swing the platform upwardly to a sufficient angle that the lower edge of the aperture 12 is moved beyond the forward faces of the pivotal supports 5, a position slightly beyond the steeper broken line representation. The platform may then be removed by a forward and upward movement.

The forward end of the platform is supported by a lift device 13, such as a hydraulic ram having a conventional pin and slot connection 14 with the platform. The cylinder of the ram 13 is connected to the fluid supply means 15 through a three-way control valve 16. The control valve has three positions, as indicated in Fig. 4, namely, "up," "neutral," and "down" positions. In the "up" position, fluid is forced under pressure from the supply means 15 to the cylinder of the hydraulic ram, thereby forcing the ram and platform in an upward direction, whereas the movement of the control valve into the "down" position allows the fluid to flow from the cylinder of the hydraulic ram to the supply means, thereby allowing the ram and the platform to descend. In the "neutral" position, flow of the fluid between the ram and the supply means is prevented and the ram and platform remain stationary.

A generally C-shaped rail 17 is secured along the forward edge of the platform, as by welding the rail to the depending web of the angle 9. A pair of supporting brackets 18 are provided with a generally T-shaped lower portion 19 positioned for sliding movement in the rail 17 to permit a longitudinal movement of the brackets along the rail 17. The upper portion of each of the brackets 18 is bifurcated to provide a pair of upwardly projecting arms 20, which are in turn provided with inwardly extending projections 21. The brackets are also provided with longitudinally projecting hubs 22, which are drilled as at 23. A shaft 24, which serves as the pintle for a bridge plate 25, has its ends extending into the drill holes 23 and is secured to both brackets.

The bridge plate 25 is hingedly supported on pintle 24 by means of a plurality of spaced hinge arms 11 which are secured, as by welding, to the under surface of the bridge plate along its rearward edge. The forward marginal portion of the bridge plate 25 is preferably bent downwardly through a small angle, as at 26. The bridge plate 25 is provided with a notch 27 at opposite sides of the bridge plate in which sockets 28 are secured. The sockets receive the laterally bent forward ends 30 of generally Z-shaped rods or links 29.

Each of the brackets 18 carries a supporting arm 32 of I-shaped section throughout the major portion of its length, and thus provides two channels for the reception of the opposed projections 21 of the bracket 18. The forward ends of these channels are open for assembly, and the rearward ends are closed. Adequate clearance between the brackets 18 and the supporting arms 32 is provided so that the arms may slide freely. The lower flanges 33 of the arms 32 have upwardly projecting stop lugs 36. Each of the arms has a drilled hole 37 in the rear end therein for the reception of a laterally bent rearward end 31 of one of the rods 29.

The sliding movement of thhe supporting arms 32 is controlled by the raising and lowering or the pivoting of bridge plate 25, which is done manually. Thus, upon the raising (counterclockwise) movement of bridge plate 25 (see Fig. 6) into the position shown in broken lines, the rods 29 retract the supporting arms 32 to the position indicated by the broken lines. In this position of the supporting arms, their forward ends are substantially flush with the forward edge of the platform so as not to damage a truck, or its contacts, as the truck is backed against the dock.

The platform 6 is provided with one or a plurality of spaced apertures 38 adjacent its forward edge, which are adapted to receive the end of a bridge shifting bar 39. The forward edge of the bridge plate 26 is provided with a centrally located notch 40 adapted to receive a lug 41 which is secured to the bar 39. In the raised position of the bridge plate 26, the bar 39 may be inserted in one of the apertures 38 and the lug 41 placed in the notch 40 in the bridge plate. The bar 39 may then be employed as a lever to slide the supporting brackets 18, the supporting arms 32, and the bridge plate along the rail 17 to the desired position at which the bridge plate is centered with respect to the truck to be loaded or unloaded. The limits of the movement of the supporting arms and bridge plate are illustrated by broken line representations at the top and bottom of Fig. 4. The depth of platform 6 and the supporting brackets 18 are such that the assembly does not extend or project beyond the wood or other bumpers 42 which are secured along each side of the pit.

In the use of the adjustable loading dock, the truck is backed into position at the dock, while the bridge is maintained in its raised position as shown in dot-dash lines in Figs. 1 and 6. In this position of the bridge, the supporting arms are in their retracted position. The bar 39 is then employed to center the bridge plate with respect to the floor of the truck body or its tail gate 43. The control lever 16 is then moved to its "up" position, whereby the forward end of the platform 6 is raised above the level of the floor of the truck. The bridge plate 25 is then pivoted into its downward position, thereby sliding the supporting arms 32 along the platform 6 into the forwardmost position of the supporting arms, wherein the lugs 36 on the lower flanges of the supporting arms are forward of the inwardly extending projections 21 of the supporting brackets 18. The control lever of valve 16 is then moved into its "down" position, allowing the forward end of the platform and the attached supporting arms and bridge plate to descend until the supporting arms and bridge plate rest upon the floor 43 of the truck.

It will be noted that the supporting arms are arched upwardly and that the lugs 36 are located at substantially the apex of the flange 33 (see Fig. 11). It is thus necessary, before lowering the bridge plate and sliding the supporting arms forwardly, that the forward end of the platform be above the floor level of the truck so as to permit the forward ends of the supporting arms to descend below the platform level sufficiently, as the arms move forwardly, to allow the lugs 36 to clear beneath the inwardly extending projections 21 of the supporting brackets 18. In the forwardmost position of the arms, the lugs 36 lie forwardly of the inwardly extending projections 21.

As the forward end of the platform and the supporting arms and bridge plate descend, the forward ends of the supporting arms and the bridge plate contact the truck floor or tail gate, and their descent becomes arrested. The platform continues its descent and the supporting arms pivot upon their rearward ends which bear upon the platform. The descent of the platform continues until the lower flanges 33 of the supporting arms come into contact with the inwardly extending projections 21 of the supporting brackets 18. In this position of the supporting arms the lugs 36 are positioned forwardly of the projections 21, thereby preventing an accidental retraction of the supporting arms.

During loading or unloading of the truck, the control lever of valve 16 is allowed to remain in its "down" position, wherein there is a free movement of the hydraulic fluid between the cylinder of the ram and the fluid supply means. The supporting arms, bridge plate, and the forward end of platform 6 are thereby allowed to follow the upward or downward movement of the floor of the truck. It will be understood that as the truck is unloaded, the springs between the truck body and the chassis will expand, raising the floor and with it the platform of the dock, and on the other hand, when the truck is being loaded, its springs will be compressed. Therefore, by providing the supporting arms 32 for resting on the floor of the truck, the dock platform 6 will be raised or lowered with the movement of the truck floor. After completion of the loading or unloading of the carrier, the forward end of the platform and its attachments are moved upwardly by shifting the control lever of the valve 16 into its "up" position. Such movement of the forward end of the platform allows the supporting arms and the bridge plate to remain in a lower position with respect to the platform 6 so that the lugs 36 lie below the level of the inwardly extending projections 21 of the supporting brackets 18. The bridge plate may then be raised and the supporting arms retracted. Upon raising of the platform sufficiently so as to allow the lugs 36 to clear the projections 21, the control lever of the valve may be shifted into its "neutral" position so as to maintain the forward end of the platform and its attachments in such position until again required for use.

It will be apparent to those skilled in the art that while the invention has been described with reference to certain specific details of construction, various modifications in size, shape, and proportions may be made without departing from the scope of my invention as set forth in the appended claims.

I claim:

1. An adjustable loading dock comprising a fixed support, a platform pivotally secured at its rearward edge to said support, means for raising and lowering the forward end of said platform, a bridge plate pivotally mounted to the forward end of said platform for movement into and out of bridging position, a pair of spaced platform supporting arms, means mounting said arms along each side and at the forward end of said platform for sliding movement longitudinally thereof, said arms being movable between two positions, an operative position in which they project beyond the forward end of said platform and an inoperative position in which they do not project appreciably beyond the forward end of said platform, and linkage means connecting said pivoted bridge plate to said supporting arms to advance said arms beyond the forward edge of said platform when said bridge plate is lowered into bridging position, and to retract said arms to inoperative position when said bridge plate is raised out of bridging position.

2. An adjustable loading dock as claimed in claim 1, wherein said arm mounting means includes a pair of spaced supporting brackets shiftably mounted at the forward end of said platform for transverse movement with respect to said platform, said brackets including arm guiding means in which said arms are slidably mounted.

3. An adjustable loading dock as claimed in claim 2, including means pivotally mounting said bridge plate on and between said arm supporting brackets.

4. An adjustable loading dock as claimed in claim 1, wherein said arm mounting means includes a rail secured to said platform along the forward edge thereof, a pair of spaced supporting brackets slidably mounted on said rail, and said brackets each having a bifurcated upwardly extending portion projecting above the platform level with the opening therein disposed longitudinally of the platform to receive one of said support arms for sliding movement therein.

5. An adjustable loading dock as claimed in claim 4, wherein said rail is C-shaped in cross section, and said supporting brackets have T-shaped lower portions slidably mounted in said rail.

6. An adjustable loading dock as claimed in claim 1, wherein said arm mounting means includes a rail secured to said platform along the forward edge thereof, a pair of spaced supporting brackets slidably mounted on said rail, said brackets having transverse bifurcated upwardly extending portions projecting above the platform level, inwardly extending projections at the upper ends of said bifurcated projections, each supporting arm having a substantially I-shaped section slidably mounted in one of said brackets with its lower flange positioned between the bifurcated portions of the bracket, its web positioned between the inwardly extending projections of the bracket, and its upper flange positioned above the inwardly extending projections of the bracket.

7. An adjustable loading dock as claimed in claim 1, wherein said arm mounting means includes a pair of spaced supporting brackets mounted to the forward end of said platform, said brackets having openings therein disposed longitudinaly of said platform and in which said arms are slidably guided, each bracket including a portion at least partially overlying its respective supporting arm and the latter having a locking means thereon positioned to engage said overlying bracket portion to lock said arm against retraction as an incident to the application of upward force to the outer end of said arm when the latter is in extended position.

8. An adjustable loading dock as claimed in claim 1, wherein said linkage means comprises a pair of connecting links, each link having one end pivotally connected to said bridge plate at one side of the pivotal mounting of said bridge plate to said platform, and each link having its opposite end pivotally connected to the rear end of one of said supporting arms and at the side of the pivotal mounting of said bridge plate to said platform opposite said first named side.

References Cited in the file of this patent

UNITED STATES PATENTS

| | | |
|---|---|---|
| 1,626,597 | Cantor | May 3, 1927 |
| 2,473,127 | Alexander | June 14, 1949 |
| 2,592,919 | Loomis et al. | Apr. 15, 1952 |
| 2,626,411 | Palmer | Jan. 27, 1953 |
| 2,644,971 | Rowe | July 14, 1953 |

OTHER REFERENCES

Architectural Record, October 1948, page 179 relied on.